United States Patent [19]
Wool et al.

[11] Patent Number: 6,121,398
[45] Date of Patent: *Sep. 19, 2000

[54] HIGH MODULUS POLYMERS AND COMPOSITES FROM PLANT OILS

[75] Inventors: Richard Wool, Newark, Del.; Selim Küsefoglu, Istanbul, Turkey; Giuseppe Palmese, Hockessin, Del.; Shrikant Khot; Ralph Zhao, both of Newark, Del.

[73] Assignee: University of Delaware, Newark, Del.

[*] Notice: This patent issued on a continued prosecution application filed under 37 CFR 1.53(d), and is subject to the twenty year patent term provisions of 35 U.S.C. 154(a)(2).

[21] Appl. No.: 09/067,743

[22] Filed: Apr. 28, 1998

Related U.S. Application Data

[60] Provisional application No. 60/063,060, Oct. 27, 1997.

[51] Int. Cl.$^7$ .......................... C09F 1/00; C08F 122/10; C08F 222/10; A61F 2/00
[52] U.S. Cl. .................. 526/238.1; 526/321; 524/211; 528/73; 424/535; 106/125.1
[58] Field of Search .................. 526/238.3; 528/73; 524/211; 106/125.1; 424/535

[56] References Cited

U.S. PATENT DOCUMENTS

| | | | |
|---|---|---|---|
| 3,291,764 | 12/1966 | Findley | 260/18 |
| 3,827,993 | 8/1974 | Cunningham | 260/22 |
| 3,855,163 | 12/1974 | Bussell | 530/230 |
| 3,931,075 | 1/1976 | Trecker et al. | 106/266 |
| 3,979,270 | 9/1976 | Trecker et al. | 522/103 |
| 4,025,477 | 5/1977 | Borden et al. | 528/73 |
| 4,119,640 | 10/1978 | Hodakowski et al. | 549/546 |
| 4,740,367 | 4/1988 | Force et al. | 424/47 |
| 4,983,176 | 1/1991 | Rao et al. | |
| 5,506,285 | 4/1996 | Timm et al. | |
| 5,576,027 | 11/1996 | Friedman et al. | 424/535 |
| 5,602,265 | 2/1997 | van den Kommer et al. | |
| 5,911,236 | 6/1999 | Hellsten et al. | 137/13 |
| 5,912,042 | 6/1999 | Cain et al. | 426/607 |

FOREIGN PATENT DOCUMENTS

| | | |
|---|---|---|
| 3938149A1 | 5/1991 | Germany . |
| 1248919 | 10/1971 | United Kingdom . |

OTHER PUBLICATIONS

Rösch et al., "Polymers From Renewable Resoureces: Polyester Resins And Blends Based Upon Anhydride–Cured Epoxidized Soybean Oil", Polymer Bulletin, 31, pp. 679–685 (1993).

Chu et al., "A Study on the Synthesis of Modified Epoxy Resin With Acrylic Acid For Composite Materials", Journal of The Chin. 1. Ch.E., vol. 20, No. 1, pp. 1–6 (1989).

*Primary Examiner*—David W. Wu
*Assistant Examiner*—Tanya Zulakaeva
*Attorney, Agent, or Firm*—Connolly Bove Lodge & Hutz, LLP

[57] ABSTRACT

The synthesis of liquid molding resins derived from plant oils that are capable of curing to high modulus thermosetting polymers and composites is described in this invention. The resins described resemble the unsaturated polyester, vinyl ester and epoxy resins presently used as the polymer matrix material in high performance glass, carbon, aramid and natural fiber reinforced composite materials. The resins disclosed herein are suitable for polymer and composite manufacture by Resin Transfer Molding (RTM), Reaction Injection Molding (RIM), Vacuum Assisted Resin Transfer Molding (VARTM), Seeman's Composite Resin Infusion Manufacturing Process (SCRIMP), Atmospheric Pressure Molding (APM), open mold casting, spray-up, Sheet Molding Compound (SMC) Bulk Molding Compound (BMC), filament winding, pultrusion, prepregs, lamination and compression molding. The resins in this invention are synthesized predominantly from plant—in particular, from the abundant and cheap, soybean—triglycerides with suitable comonomers and reactants that functionalize and render the plant triglyceride polymerizable. The polymerization reactions involve free radical initiated addition, condensation or ring opening polymerization. The functionalized triglycerides is used in conjunction with reactive diluents, accelerators, viscosity modifiers, cross-linking, toughening and coupling agents. The liquid resins are then mixed with initiators, catalysts and the reinforcing fibers and chain extended or cross-linked to give the final cured composite.

20 Claims, 8 Drawing Sheets

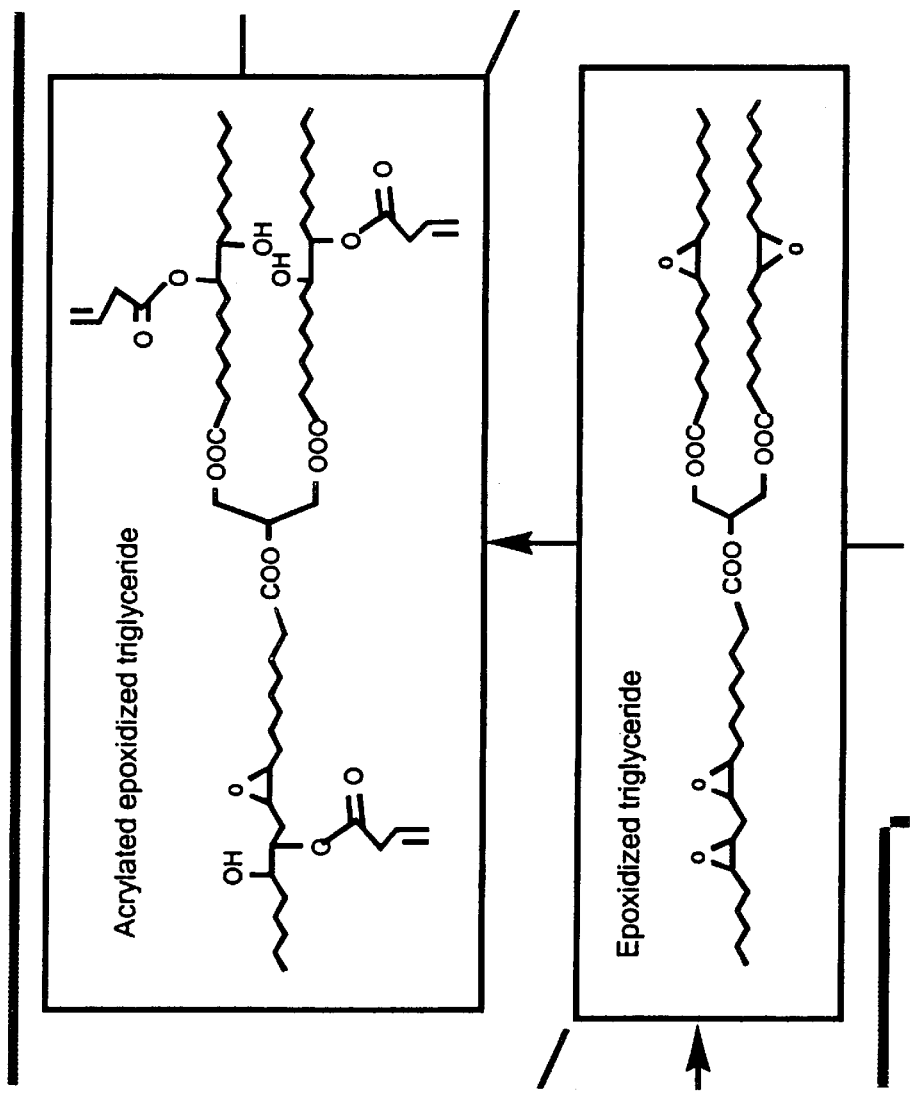
Fig. 1B. Reaction Pathways of Triglyceride

HIGH MODULUS POLYMERS AND COMPOSITES FROM PLANT OILS

This application claims benefit to U.S. Provisional application Ser. No. 60/063,060 Oct. 27, 1997.

FIELD OF THE INVENTION:

This invention refers to the synthesis and application of liquid resins derived predominantly from plant triglycerides as raw materials, that are capable of curing to high modulus thermosetting polymers suitable for use alone or as the matrix polymer in fiber reinforced composites.

BACKGROUND OF THE INVENTION

Polymer Matrix Composites (PMC) are manufactured by embedding strong fibers such as, glass, carbon, aramid or natural fibers in a polymer. The composite materials benefit from the reinforcement provided by the strong fibers and have tensile, bending and impact strength properties much higher than non-reinforced polymers. Such composites find use in infrastructure, automotive, construction, aircraft and military industries. The polymer used in the composite, also known as the matrix, may be thermoplastic or thermosetting. Thermoplastic polymers are capable of melting upon heating with no change in chemical structure, whereas, thermosetting polymers are capable of chemically reacting. This converts the original, usually liquid, polymer to a rigid solid polymer that can no longer melt upon heating. The latter thermosetting polymers are used as liquid molding resins, successful examples of which include, but are not limited to, the well known unsaturated polyester, vinyl ester and epoxy resins. These resins are usually injected as a liquid into a mold containing the appropriate reinforcing fiber and are then cured in the mold to a rigid solid by the action of heat and catalyst. The successful liquid molding resins must have a low initial viscosity, have a long shelf life at room temperature, be capable of chemically reacting to a solid polymer by heating and/or addition of catalysts, must be able to react without the formation of volatile by-products, must have strong adhesion to the fibers used as the reinforcing agent and must have good physical properties such as, high ultimate tensile strength, fatigue resistance, impact strength, bending moment and high softening temperature.

Liquid molding resins are usually prepared by first synthesizing a low molecular weight polymer having the functional groups required for the cross-linking reaction. To achieve the desired low viscosity the polymer may be dissolved in a reactive diluent. If the cross-linking reaction is of the free radical addition type, the required functional group on the polymer is ethylenic unsaturation and the reactive diluent is also an ethylenicly unsaturated compound such as, but not limited to, styrene, α-methyl styrene, divinyl benzene, methyl methacrylate, etc. The relative ratios of unsaturated groups on the polymer and the amount of the reactive diluent are important parameters that those knowledgeable in the field have learned to optimize.

Just prior to use, liquid molding resins are mixed with catalysts and accelerators that start and facilitate the cross-linking reaction. If the cross-linking reaction is of the addition type, such accelerators as cobalt naphtenate, aromatic tertiary amines, etc., and free radical initiators such as, but not limited to, methyl ethyl ketone peroxide, benzoyl peroxide, cumyl hydroperoxide , etc., are added. The choice of initiators and accelerators depends on the reactivity of the polymer and the temperature and the time desired for the cure reaction. The choice of accelerators and initiators are well documented in the literature and are well known by those experienced in this field.

Successful liquid moldings such as, but not limited to, unsaturated polyesters, vinyl esters and epoxy resins are all synthesized using raw materials derived ultimately from petroleum. These include, but are not limited to, among others, maleic anhydride, phthalic acid, isophthalic acid, aliphatic diols, bisphenol-A, acrylic and methacrylic acid, aliphatic and aromatic diamines, all of which are petroleum derivatives. Replacing some, or all, of these petroleum derived raw materials with renewable plant-based raw materials is attractive, both economically and socially, as such raw materials are cheaper and their use contributes to global sustainability by not depleting scarce resources.

The use of plant-based raw materials such as plant oils is further useful as such naturally occurring compounds are usually consumed readily by microorganisms. In fact, plant triglycerides are readily hydrolyzed in vivo by lipase secreting bacteria. This would make polymers derived from such raw materials easily biodegradable in natural media. This aspect of these polymers is an additional advantage over polymers derived solely from petroleum based raw materials, very few of which are degradable by naturally occurring bacteria.

It is also the intention of the present invention to introduce a high modulus resin system that is suitable for composite formation using man made fibers such as, glass, carbon and aramid fibers as well as natural fibers, including, but not limited to, animal fiber (e.g., wool, cashmere, hair, bird feathers, etc.), and plant or vegetable fiber (cotton, sisal, fibrous cellulose, hemp, hay, straw, flax, jute, pine needles, etc.). In this manner, it is intended to produce composites whose matrix as well as reinforcement are predominantly made from natural and renewable materials. These materials are inexpensive and should find use in high volume applications such as, but not limited to, particle board for furniture and construction, engineered lumber, reinforced components for automotive, MDF panels for construction, ceiling panels and sculpture.

The use of epoxidized triglycerides, especially epoxidized soybean oil, is well documented. This compound is available in many levels of epoxidation and for the purposes of this invention, several are suitable: Paraplex G-62 available from C. P. Hall Company ; Chicago, Ill.; Drapex 6.8 available from Witco Co.; Taft, La. (having on the average 4.2 epoxy groups per triglyceride); and Vikoflex 7170 from Elf Atochem. The current commercial use of epoxidized soybean oil is as plasticizer for polyvinyl chloride.

The use of acrylated epoxy oils in various resins has also been investigated. European Patent 81973 discloses the use of acrylated epoxidized triglycerides to synthesize photopolymerizable coatings for glass. In the Japanese Patent 73-98883, acrylated epoxidized triglycerides is used to prepare ink vehicles that are capable of photocuring. In U.S. Pat. Nos. 4,025,477, and 3,931,075, acrylated epoxidized triglyceride is treated with isocyanates and 2-hydroxyethylacrylate to give electron beam-curable coatings for metals with a Sward hardness of 14. In Japanese patent 75-126706, acrylated epoxidized triglyceride is used for photocurable ink vehicles used for textile printing. In Japanese Patent 73-98885, acrylated epoxidized triglyceride is used with toluene di-isocyanate and 2- hydroxyethylacrylate to give a co-polymer that is capable of photocuring in textile printing applications. In French Patent 76-37 678, acrylated epoxidized triglyceride is used as a photocurable high flexibility coating for leather. In Japanese Patent 78-26116, acrylated epoxidized triglyceride is used as a photocurable ink vehicle that gives a faster cure and higher gloss. In Japanese Patent 77-137522, acrylated epoxidized triglyceride is used in conjunction with glycidyl acrylate-octylacrylate co-polymer and alumina filler to prepare a potting compound used for fluorescent light fixtures that eliminates transformer humming. In European Patent 90-203517, the use of acrylated epoxidized triglyceride as electron beam or UV curable thermosetting inks, coatings, and adhesives, is disclosed. W. Shi et al., in J. Photopolym. Sci. Technol., 5, 453, (1992), describe acrylated epoxidized triglyceride resin for high-gloss UV cured coatings. All of the above references are incorporated by reference in its entirety, for all purposes.

Investigation of the literature shows that the prior art allows acrylated epoxidized triglyceride resins to be used as surface coatings only. These are necessarily flexible, lightly cross-linked amorphous polymers, with little or no structural strength. These substances have been used in the prior art as varnishes, adhesives, protective coatings, ink vehicles, and high-gloss surface treatments, none of which requires any structural strength. As will be apparent below, in this disclosure, new chemical reactions and modifications allow epoxidized triglycerides to be polymerized to higher molecular weights and higher cross-link densities so that the new resins have structural strengths comparable to those of other liquid molding resins now in commercial use. Such use includes, but is not limited to, the high volume composite utilization fields of civil infrastructure, defense, aerospace, marine offshore, construction, bridge rehabilitation, automotive, farming equipment, electronics, etc.

Ring opening cure reactions of epoxy resins are well known. The use of diamines, anhydrides, dicarboxylic acids and diols have been reported in the literature. These reactions are exceptionally easy when the epoxy ring that is undergoing the reaction is terminal, that is, at the end of the molecule, which is the case in all commercially successful epoxy resins. In epoxidized triglycerides, however the epoxy group is necessarily internal, such that it is substituted on both sides by bulky alkyl groups, rendering it far less reactive towards the traditional ring opening polymerization reactants. Some of the resins described in this disclosure use the epoxy functional group of these triglycerides with various diols, diamines, anhydrides and diacids to produce highly cross-linked network polymers by ring-opening polymerization reactions.

The advantage of ring opening polymerization reactions is twofold: First, there is no by-product during the ring-opening polymerization, as all reactions are of the addition type; second, the degree of crosslinking, and therefore the final properties of the cured resin, can be controlled by merely adjusting the stoichiometry of the epoxy component and the second reactant, e.g., diols, anhydrides, diamines, dicarboxylic acids, alkoxides, etc.

Another advantage of such thermally induced epoxide ring-opening polymerization is, that unlike free radical addition reactions, ring-opening reactions can be stopped and restarted at will by decreasing or increasing the temperature, respectively. This allows individuals knowledgeable in the art to synthesize pre-polymers of desired molecular weight and viscosity, which can be kept at room temperature indefinitely (A-Stage), but which can be cured to a solid state in a mold merely by the application of heat (B-Stage).

Commercially successful epoxy resins usually consist of a two component system, the epoxy prepolymer and the curing agent, both as separate components. These components have to be metered, weighed, and mixed by the end user. The avoidance of two-component cure systems makes the resins described herein more attractive, as the end user need not be concerned with these complicated and error-prone mixing and metering steps.

Another advantage of the resins described in this invention is that the physical state and rigidity of the product can further be manipulated by the addition of various co-reactants having reduced or increased reactivity so that a desired fraction—or, in fact, all—of the epoxy groups are used in the final stage of the reaction. Such co-reactants include, but are not limited to, primary and secondary alcohols and primary and secondary amines. The rate of the ring-opening polymerization can be adjusted by using desired amounts of ring-opening catalysts, which include, but are not limited to, cyanoguanidines, imidazoles, Lewis acid, metal alkoxides, and bases.

An added novelty of this disclosure is that the epoxy content of the epoxidized oils depends on the level of unsaturation of the oil used as raw materials. It is well known that oils from different plants such as, but not limited to, cotton, sunflower, corn, soy bean, and linseed have different amounts of unsaturation. Depending on the property desired in the final product, various oils, or mixtures thereof, may be used for the epoxidation reaction. Therefore, a raw material of the exactly desired epoxy equivalent can always be obtained by mixing epoxidized triglycerides from different plants. In this disclosure, the variation of unsaturation among the various plant oils is used to advantage. A promising development in this field is the future availability of triglycerides from genetically engineered plants which contain much higher levels of unsaturation and controlled distribution of fatty acid chain length than currently attainable from the natural plants.

The resins disclosed herein are more affordable than the hitherto commercially available liquid molding resins; their manufacture involves simple reactions that require simple reactors and machinery, and their origin from renewable resources makes them environmentally friendly and supportive of global sustainability.

Ring opening polymerization of epoxidized triglycerides has been disclosed in U.S. Pat. No. 3,291,764 where triethylenetetramine, p-phenylenediamine, phenylbiguanidine, etc., have been used as curing agents to give semi-fluid resins that were soluble in aqueous acid and used as a surface coating. Japanese Patent 73-102647 describes mixtures of epoxidized triglycerides, commercial epoxy resins such as Epikote 828 and diaminodiphenyl-methane to give moldable solids; Frishinger, in Adv. Che. Ser. 239, 539, (1994) describes mixtures containing small amounts of plant triglycerides and mostly commercial epoxy resins and epoxy curing agents for the purposes of toughening commercial epoxy resins.

Roesch, et al., in Polymer Bull. (Berlin) 31,679, (1993) describes reaction of epoxidized triglycerides with maleic, succinic, hexahydrophtallic norbornanedicarboxylic and phthalic anhydride. The reaction is run in a polypropylene melt with small amounts of epoxidized triglyceride dispersed in the melt where the dispersed phase is the epoxidized triglyceride and the continuous phase is polypropylene. The aim of this work is to produce toughened polypropylene.

Hydrogen peroxide oxidation of triglycerides to epoxidized triglyceride has been described by R. Oda, in Journal Society of Chemical Industry Japan, 41, 195–195 (1938) and by Y. Isii, in Journal Society of Chemical Industry, Japan, 43, 255–7, 315–7, 374–9 (1940)., and by Swern and Billen in Journal of Organic Chemistry, 67, 1786, (1945).

Maleinization of triglycerides have been the subject of many publications: Teeter, in J. Org. Chem. 22, 512, (1957) describes the reaction of maleic anhydride with conjugated fatty acids; Bickford, in J Am. Oil Chemist's Soc., 25, 254, (1948) describes maleinization of unconjugated triglycerides. Plimmer, in J. Oil Color Chemists' Assoc., 32, 99 (1949) describes the reaction of a number of different triglycerides with maleic anhydride. Maleic anhydride is known to react with triglycerides in an ene reaction, as well as insertion reactions giving oligomeric triglycerides. The procedures described in these papers are used to prepare maleic modified oils used in varnish manufacture. The reactivity of the anhydride has been used to react it with 2-hydroxyethylmethacrylate to give free radical curable resins for surface coating applications, as described in the Japanese Patent 81-64464, and for UV curable coatings, as described in the German Patent 89-3938149.

Glycerolysis of triglycerides has been known since antiquity. This is the traditional starting material for alkyd resins used as binders for "oil paints." There are many references to the formation of monoglyceride oils. There are also numerous references to polyesterification of monoglycerides with various diacids and dianhydrides. The comonomers that have been used are phthalic anhydride, fumaric acid, pentaerythritol, glycerol, and aliphatic diacids, such as, but not limited to, succinic, glutaric, and suberic acid. The common point among the previous work is the formation of polyesters with saturated diacids and the use of the unsaturation contained in the fatty acid itself for "air drying", that is, peroxidative cross-linking of the products.

Monoglyceride polyesters have been described in the literature: For example, Japanese Patent 74-103144, describes phthalic anhydride alkyd for air drying paints; U.S. Pat. No. 3,827,993 describes diethylene glycol-phthalic anhydride alkyd for surface coating; U.S. Pat. No. 4,740,367 describes fumaric acid alkyd used as an emollient base for skin and hair care products; Japanese Patent 73-125724 describes phthalic anhydride and pentaerythritol alkyd used for acid curable coatings; Japanese Patent 74-91317 describes phthalic anhydride and glycerol alkyd used for storage stable coatings; Japanese Patent 78-52321 describes phthalic anhydride and pentaerythritol alkyd used for air curable, water resistant coatings; Japanese Patent 80-62752 describes phthalic anhydride alkyd used for tough, air drying, glossy coatings; Japanese Patent 84-254873 describes isophthalic acid and polyethylene glycol alkyd for surface coatings.

Amidation of triglycerides has been discussed in a number of sources. Fatty acid amides are commercially important substances used as antistatic and softening agents for textiles. In British Patent 1248919, fatty acid amides made from fatty acids and diethanolamine to produce foamed resins are disclosed. There is no work in the literature on direct amidation of triglycerides, maleinization of the diethanolamide with maleic anhydride or on the polymerization of the maleate half-esters. The resin system disclosed here does not involve a polyester. It is only a half-ester of maleic anhydride—that is, a 1:2 adduct of the monoglyceride with maleic anhydride. This product is formed without any by-product by the reaction of the plant monoglyceride hydroxyl groups with maleic anhydride. The resulting molecule is unique and has not been synthesized before. The resin system disclosed herein does not depend on the air oxidation of the fatty acid unsaturation; in fact, those double bonds are intact in the product. The resin system described in this invention cures via the co-polymerization of reactive diluent and the maleate half-esters. In this invention, maleic anhydride is used as the esterification reagent and, among other reactions and processes, excess glycerol is used as a means of adjusting the cross-link density, thereby producing a structurally strong thermoset from natural triglycerides. The new thermoset and its modifications is recommended for use in composite manufacturing with high-modulus synthetic and natural fibers.

BRIEF DESCRIPTION OF THE INVENTION

The liquid resins described herein are derived from plant and animal oil triglycerides by suitably functionalizing the triglyceride with chemical groups that render it polymerizable. The triglyceride molecular structure is a combination of various triesters of fatty acids linked together with glycerol. The fatty acid residues are linear carboxylic acids containing from about 4 to about 30 carbon atoms, but preferably from about 14 to about 22 carbons and from about zero to about 4, or preferably from about 2 to 3 carbon-carbon double bonds. As obtained in nature, these double bonds are predominantly in the cis (Z) configuration and, in the case of polyunsaturated acids, not conjugated. The fatty acids derived from triglycerides include, but are not limited to the following: Lauric (C12:0), i.e., 12 carbon atoms long containing zero C=C double bonds, Myristic (C14:0), Palmitic (C16:1), Stearic (C18:0), Oleic (C18:1), Linoleic (C18:2), Linolenic (C18:3), Arachidic (C20:0), Gadoleic (C20:1), Behenic (C22:0) and Erucic (C22:1). Typical plant oil triglycerides used for the purpose of this invention contain about 10–20% saturated, about 20–30% mono-unsaturated, about 40–60% di-unsaturated, and about 5–15% tri-unsaturated fatty acid residues, but other distributions, both narrow and broad, of fatty acid residues can also be used for the thermoset and plastic resins described in this invention.

This invention prescribes the use of saturated and unsaturated triglycerides and their fatty acids residues from both plant and animal sources such as, but not limited to, lard, rape, palm, beef tallow, fish, soy, canola, sunflower, safflower, rice bran, corn, peanut, cottonseed and kolza. The C=C double bonds that constitute the unsaturation, create reactive sites that have traditionally been used for oxidative coupling reactions leading to "air drying" of some plant oils. This is the chemistry of the well known alkyd resins used for paint and varnish binders. While there are many examples of the use of drying oils for surface coating applications, the unsaturation on the plant triglycerides is not sufficiently reactive to allow homo- or co-polymerizations of the molecule directly to give resins with any degree of structural strength or stiffness. However, for those experienced in the art, the triglyceride molecule offers a number of reactive sites for functionalization. These include but are not limited to, the double bond, the allylic carbons, the ester group and the carbons alpha to the ester group. This invention discloses chemical reactions that use these active sites to introduce polymerizable groups on the triglyceride and the subsequent polymerization and composite formation using these new reactive triglycerides to give new polymers and composites with new composition of matter.

The triglycerides used in this invention were samples prepared from the crude plant oils by base extraction to remove free acids, and heated and filtered to remove the gummy non triglyceride residues. No attempt was made to deodorize, decolorize and to winterize the triglycerides. All of the resins described in this invention were characterized by the usual instrumental analysis techniques known by those knowledgeable in the art. These techniques include, but are not limited to, nuclear magnetic resonance spectroscopy, Fourier transform infra red spectroscopy, mass spectroscopy, ultraviolet spectroscopy, surface hardness test, differential scanning calorimetry, dynamic mechanical analysis and mechanical testing.

DESCRIPTION OF FIGURES

FIGS. 1A–1H show a number of chemical pathways that are used for the purpose of introducing reactive sites on the triglyceride molecule which lead to the synthesis of the new monomers and composite resins disclosed in this invention.

DETAILED DESCRIPTION OF THE INVENTION

Figure 1A:
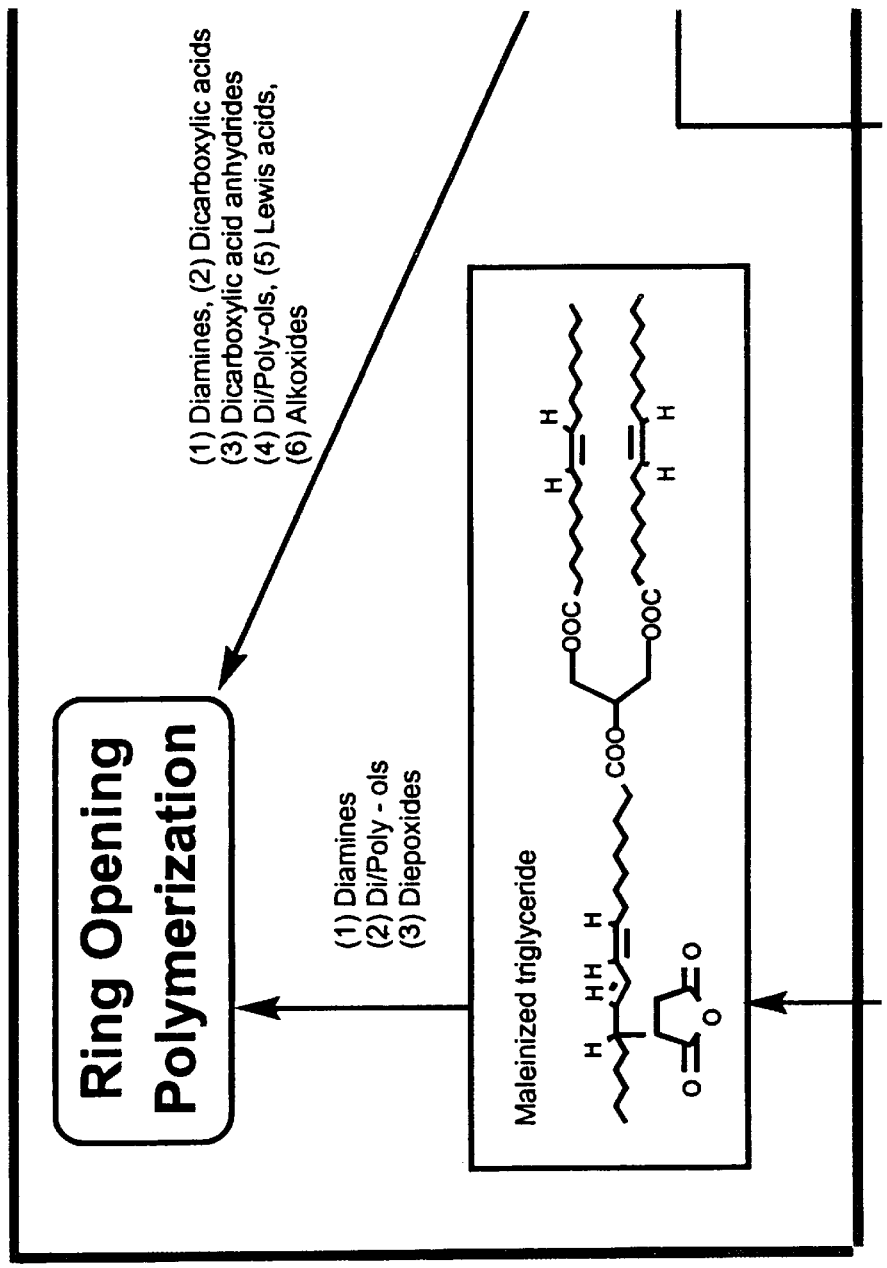
Figure 1C:
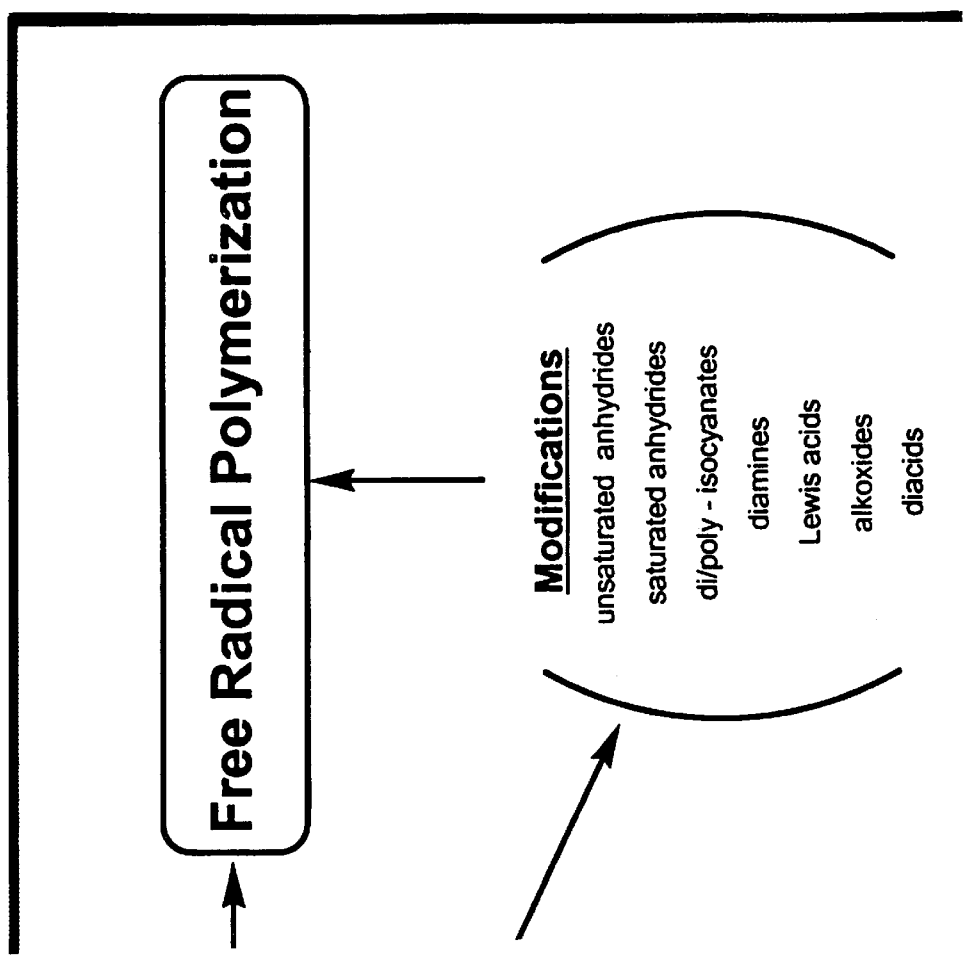
Figure 1D:
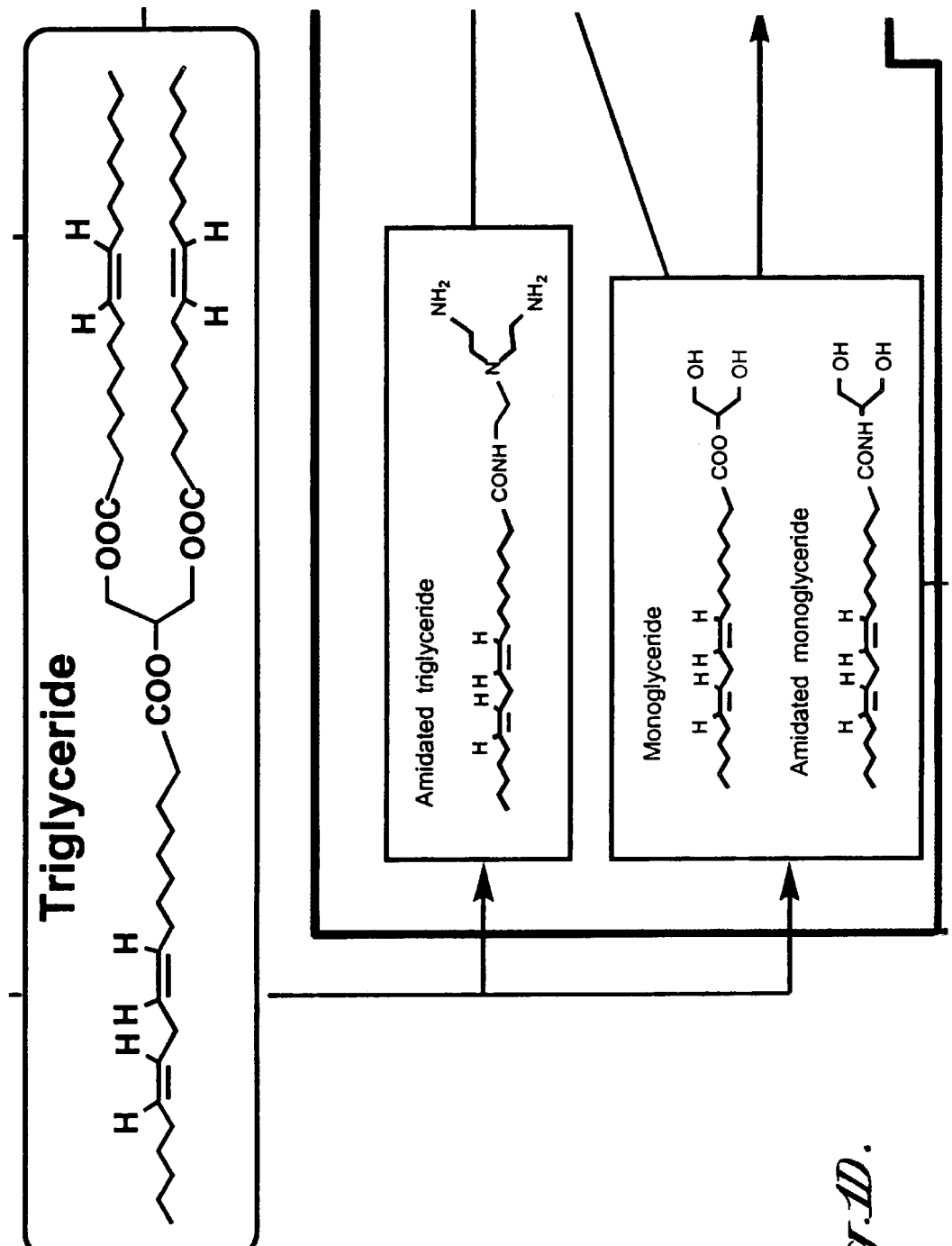
Figure 1E:
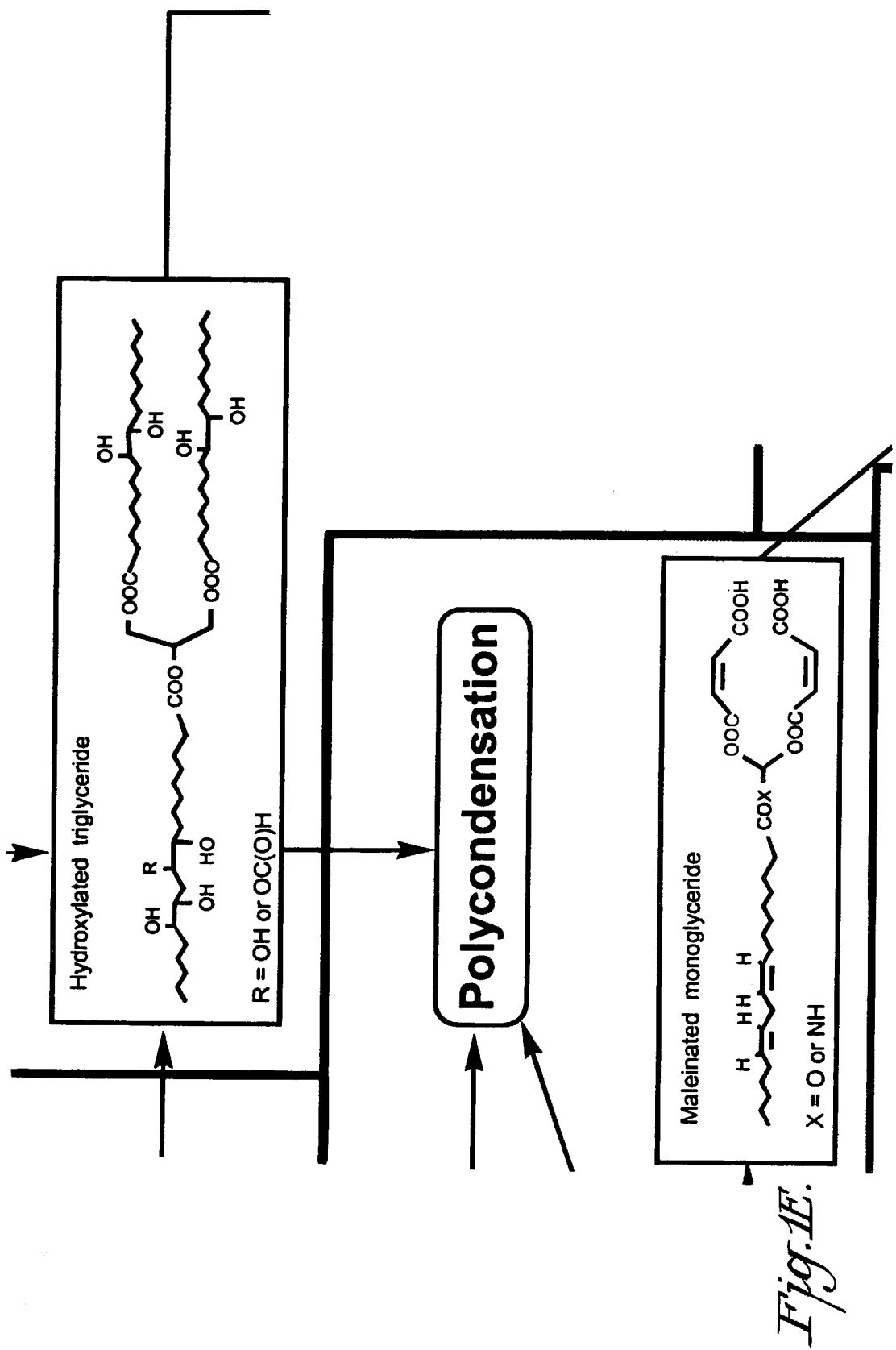
Figure 1F:
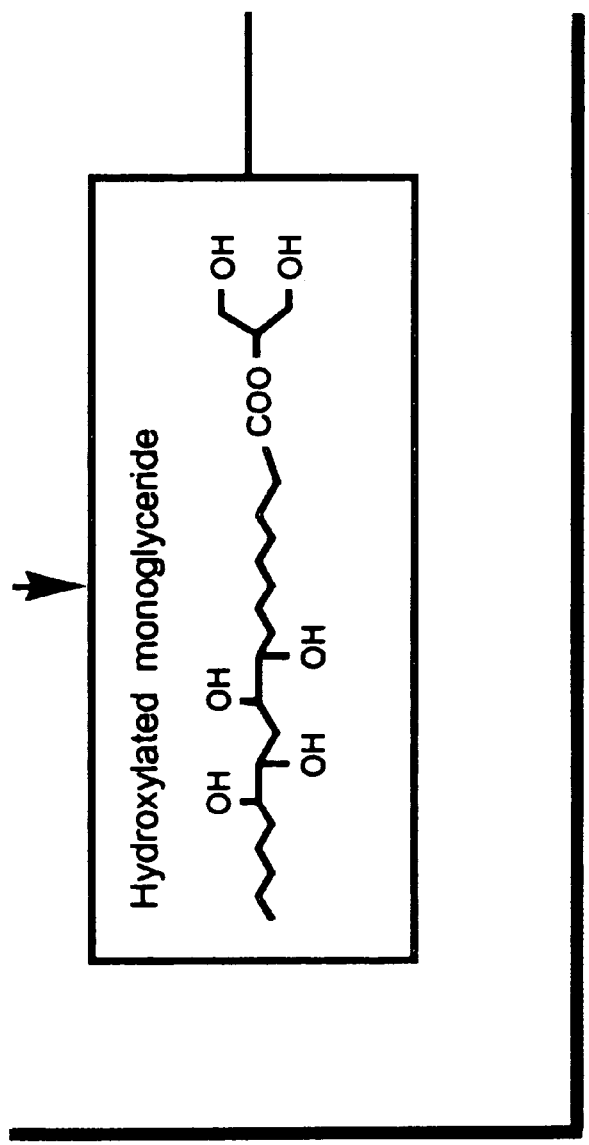
Figure 1G:
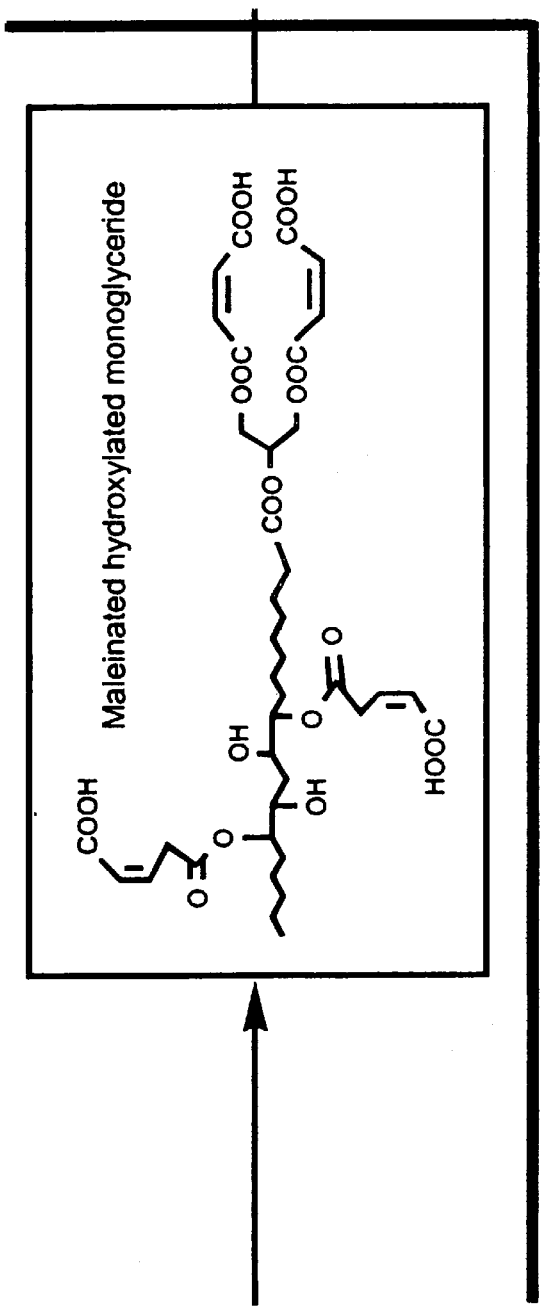
Figure 14:
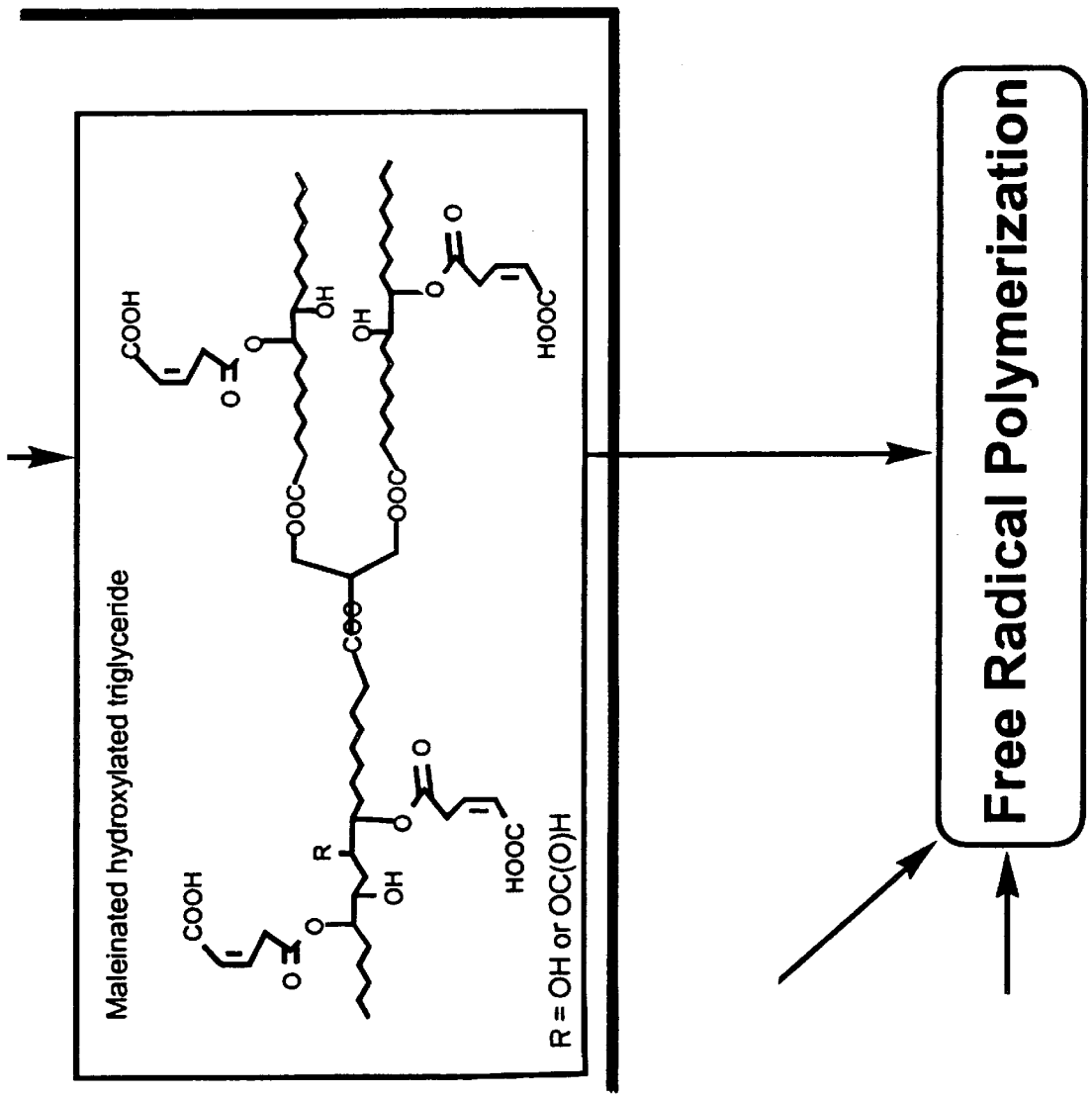

FIGS. 1A–1H show a number of chemical pathways that are used for the purpose of introducing reactive sites on the triglyceride molecule which lead to the synthesis of the new monomers and composite resins disclosed in this invention. The triglyceride can be directly oligomerized without any functionalization by oxidative coupling, sulfur vulcanization, olefin metathesis, photolysis, free radical co-polymerization with reactive diluents and polymerization with bis-maleimids to give viscous oils, soft rubbers and low glass transition temperature, Tg, solids. None of these materials are ultimately suitable as high modulus liquid molding resins.

The triglyceride, as shown in FIGS. 1A–1H, was suitably functionalized to the epoxidized triglyceride, to the hydroxylated triglyceride, and the hydroxy-formylated triglyceride by the reaction of the double bond functionality ; to the maleinized triglyceride by the reaction of the allylic carbon functionality and to monoglycerides and to hydroxy amids by the reaction of the ester functionality. All of these derivatives are new monomers that are capable of polymerization to rigid polymers suitable as liquid molding resins for high volume composite manufacturing applications, as discussed below.

Epoxidized Triglyceride

Conversion of the plant triglycerides to epoxidized triglycerides has been accomplished by reaction with hydrogen peroxide and the resulting epoxide can be polymerized in a number of ways. The epoxy groups were acrylated with acrylic acid and polymerized and crosslinked with free radical initiators in the presence of reactive diluents such as, but not limited to, styrene, divinyl benzene, methyl methacrylate, etc., to give rigid resins. Compounds such as, but not limited to, benzoyl peroxide, methyl ethyl ketone peroxide, hydrogen peroxide, and cumene hydroperoxide can be used as free radical initiators. In the preferred embodiment, USP 245 (2,5-dimethyl 1-2,5 bis (2-ethylhexanoyl peroxyhexane) (peroxy ester) (by Witco Corp.) was used as the free radical initiator.

In addition to the free radically polymerizable acrylate ester, the acrylated triglyceride, now has newly formed hydroxyl and residual epoxy groups. In this invention, the residual epoxy groups are now used to chain extend the acrylated base resin with reactive difunctional molecules including, but not limited to, diamines, alkyl and aromatic diols, anhydrides, carboxylic acids, alkoxides, hydroxides and Lewis acids. When the base resin is thus modified, increased molecular weight and increased cross-link density of the resin allows the formation of cured resins with mechanical properties that are superior to unmodified acrylated epoxidized triglyceride resins produced according to prior art. Examples 1–8 describe the synthesis, curing and properties of resins prepared according to these reactions. Diamines that may be beneficially used include, but are not limited to, methylene dicyclohexyl amine, triethylene tetraamine, p-diaminobenzene, methylene dianiline, trimethyl hexamethylene diamine, diethanolamine, propanediamine, isophorone diamine. Diols that can be beneficially used include, but are not limited to, ethylene glycol, 2,5-hexanediol, 1,4-butanediol, pentaerythritol, bisphenol-A, 1,6-hexanediol, hydroquinone, sorbitol, inisitol, etc. Anhydrides that can be beneficially used include, but are not limited to, maleic anhydride, phthalic anhydride, pyromellitic dianhydride, nadic anhydride, succinic anhydride, cyclohexanedicarboxylic anhydride, etc. Alkoxides, hydroxides and Lewis acids that can be beneficially used include, but are not limited to, sodium and potassium hydroxide, methoxide, isopropoxide, aluminum trichloride, boron trifluoride, etc.

In this invention, the newly formed hydroxy groups are also used for chain extension of the base resin by the use of appropriate hydroxy reactive difunctional molecules including, but not limited to, diisocyanates, ethylenicly unsaturated anhydrides, saturated anhydrides, diacids and diacid halides. These chain extending reagents include, but are not limited to, toluene diisocyanate, poly aromatic poly isocyanates, methylene diphenyl isocyanate, maleic anhydride, cyclohexane dicarboxylic acid anhydride, succinic acid, adipoyl chloride, etc. It is these very modifications that provide the increased molecular weight and crosslink density to yield structurally strong resins and make the resins described in this invention unique.

The epoxidized triglyceride can be polymerized and crosslinked via ring opening polymerization by a large number of epoxy reactive molecules including, but not limited to, diamines, anhydrides, diols, dicarboxylic acids and they can be hydrolyzed in acidic medium to a polyol and can polymerize by ring opening polymerization by the use of suitable initiators. Diamines that may be beneficially used include, but are not limited to, methylene dicyclohexyl amine, triethylene tetraamine, p-diaminobenzene, methylene dianiline, trimethyl hexamethylene diamine, diethanolamine, propanediamine, isophorone diamine diaminodiphenyl sulfone, etc. Diols that can be beneficially used include, but are not limited to, ethylene glycol, 2,5-hexanediol, 1,4-butanediol, pentaerythritol, bisphenol-A, 1,6-hexanediol, hydroquinone, sorbitol, inisitol, etc. Anhydrides that can be beneficially used include, but are not limited to, maleic anhydride, phthalic anhydride, pyromellitic dianhydride, nadic anhydride, succinic anhydride, cyclohexanedicarboxylic anhydride, etc. Alkoxides, hydroxides and Lewis acids that can be beneficially used include, but are not limited to, sodium and potassium hydroxide, methoxide, isopropoxide, aluminum trichloride and boron trifluoride. Acidic reagents that can be used include, but are not limited to, sulfuric, hydrochloric and hydrobromic acids., etc. As will be evident below, all of these resins are potentially useful liquid molding resins that cure without the use of reactive diluents or free radical initiators. The absence of any volatile and usually toxic reactive diluent makes these resins safer to handle than resins that are produced according to prior art. Another significant advantage of these resins over similar resins produced according to prior art, is that the cure reactions can be started and stopped at will. The cure reaction can be taken to any extent desired, the product can be kept for considerable periods and then cured to completion later. By those knowledgeable in the art, these resins can by conveniently formulated to A-Stage resins that are capable of curing to B-Stage in the mold. Hydrolyzed epoxidized triglycerides can also be used advantageously by polymerizing them with diisocyanates or reacting them with ethylenicly unsaturated anhydrides to free radically curable half-esters. Reagents that can be beneficially used include, but are not limited to, toluene diisocyanate, poly aromatic poly isocyanates, methylene diphenyl isocyanate, and maleic anhydride. Examples 9–14 pertain to resins synthesized and cured by such reactions.

Epoxidized triglycerides can also be converted to resilient rubbers by careful control of molecular weight and cross link density. The resulting rubber can be used as a substitute for petroleum based rubber and can also be used as a rubber toughening agent in rigid composites.

Hydroxylated Triglyceride

Plant triglycerides have been oxidatively hydrolyzed by hydrogen peroxide in the presence of formic acid. In this invention, the reaction medium is such that the initially formed epoxidized triglyceride cannot be isolated, but is converted directly to a mixture of dihydroxy and hydroxyformate derivatives. The reaction is run in an aqueous solution of formic acid by emulsifying the triglyceride by high-shear stirring. Controlled addition of hydrogen peroxide at room temperature gives the poly-hydroxylated triglyceride. This mixture is then extracted with an organic solvent immiscible with water, such as, but not limited to, diethyl ether or chloroform. The organic phase is separated, dried and evaporated to yield the hydroxylated triglyceride. The removal of water can also be done without the use of an organic solvent by spray drying of the reaction product, using methods known by those knowledgeable in the art.

The product is a new triglyceride whose double bonds have been hydrolyzed to 1,2 diols and hydroxy formates. As such, the hydroxylated triglyceride can be conveniently reacted with maleic anhydride to the maleate half-esters which are now capable of polymerizing free radically. Both the amount of hydroxylation and the amount of maleinization can be controlled to give new resins with the desired degree of unsaturation. By the optimization of these factors, liquid molding resins with high performance properties suitable for polymer composite applications can be produced. Due to the presence of additional carboxylic acid polar groups derived from maleic anhydride, and the unreacted hydroxyl groups, the adhesion of this resin to the fiber surface is stronger than the resins made according to prior art. Mixtures of hydroxylated triglycerides, and their acrylated or maleinated derivatives with other functionalized triglycerides can be used to obtain better fiber/matrix strength.

Hydroxylated triglyceride is also an excellent monomer that can be used with commercial epoxy resins as co-monomer and curing agent. This resin is composed of hydroxylated triglyceride, maleic anhydride, and a commercially available epoxy compound such as Epon 828 (Shell Chemical Co.), in a certain stoichiometric ratio having about 80–20% hydroxylated triglyceride, and about 20–80% Epon resin. The preferred embodiment has the ratios of hydroxylated triglyceride:MA:Epon, between about 40:20:40 and about 50:20:30. This resin system can be cured thermally with tertiary amine catalyst. In this invention, the resin system contains no reactive and volatile diluents and does not require the addition of free radical initiators.

Analysis of the partially cured samples indicates that the hydroxylated triglyceride is first maleinated to maleate half-ester and the carboxyl end of the molecule then reacts with the epoxy ends of the Epon resin. The ultimate tensile properties and toughness of this resin system can be optimized by the correct choice of stoichiometry, by those knowledgeable in the art. Examples 17–21 describe the synthesis, curing and properties of resins made by these methods.

Maleinized Triglyceride

The allylic positions on the triglyceride molecule are susceptible to many reactions, among which is the ene reaction with strong enophiles. The reactivity of the enophile maleic anhydride with unsaturated triglycerides is well known and is the basis of "bodied" oils that have been traditionally used in naval stores and marine varnishes. Maleic anhydride is known to react with triglycerides in an ene reaction as well as insertion reactions giving oligomeric triglycerides. The reactivity of the anhydride has been used to react it with 2-hydroxyethylmethacrylate to give free radical curable resins for surface coating applications. The degree of maleinization of the triglyceride can be controlled by the amount of maleic anhydride used in the reaction and can be from about 1 to about 10, and preferably, about 1.5 to about 4 succinic anhydride residues per triglyceride. In the preferred embodiment, about 2 to 3, and preferably 2.6 succinic anhydride residues per triglyceride, was found to give optimal viscosity and reactivity properties. This invention describes new resins derived from maleinized triglyceride using the reactivity of the newly introduced succinic anhydride moiety with polyamines, polyols and bis epoxides. All of these resins have the previously mentioned property of not containing any volatile and reactive diluent and not requiring any free radical initiator to effect cure.

Maleinized triglyceride can be reacted with various diamines to give rigid resins, including, but not limited to, methylene dicyclohexyl amine, triethylenetetramine, jeffamine (polymeric diamine produced by Texaco), trimethylene hexanediamine, isophorone diamine, diethanolamione, urea, phenylene diamine, 1,6-hexanediamine, and tris(2-aminoethyl)amine. The resins have amido acid functional groups and should possess good adhesive properties with the commonly used reinforcing agents such as, but not limited to, glass, carbon, aramid and natural fibers. The reaction of the maleinized triglycerides with polyamines is exceptionally fast giving instantaneous cures at room temperature and leading to resins that are capable of curing under adverse environments such as cold climates.

Maleinized triglycerides can also be cured by alcoholysis of the anhydride. These reactions involve temperatures around 100° C. and require tertiary amine catalysts such as [2.2.2] diazobicyclooctane or dimethyl benzylamine and are slower reactions compared to amidolysis reactions. Diols and polyols that can be beneficially used to chain extend and cure maleinized triglycerides, include, but are not limited to bisphenol-A, ethylene glycol, glycerol, pentaerythritol, sorbitol, inisitol, glucose, sucrose, starch, polyvinyl alcohol, fatty acid monoglycerides, etc.

Epoxide ring opening polymerization with anhydride curing agents are well known and a large number of anhydrides such as, but not limited to, maleic anhydride, phthalic anhydride, pyromellitic dianhydride, nadic anhydride, succinic anhydride, cyclohexanedicarboxylic anhydride, etc., have been used to cure commercial epoxy resins. Imidazole or tertiary amine catalysts are usually employed to affect this reaction. In this invention, maleinized triglycerides have been used as curing agents and co-monomers for epoxy containing resins. Epoxy resins that can be beneficially used to manufacture polymers and composites, include, but are not limited to epoxidized triglycerides, commercial epoxy resins such as Epon 828 (Shell Chemical Co.), etc. Examples 22 and 23 describe the synthesis of resins made from maleinized triglycerides.

Glycerolyzed Triglyceride

Alcoholysis of plant triglycerides with glycerol to yield monoglycerides is a well established reaction used in alkyd resin manufacture. In the prior art, monoglycerides are polyesterified with diacids or diacid anhydrides to short polyesters that are primarily used as paint binders for so called "Oil Paint". The short polyesters with pendant fatty acids are then allowed to "dry" by oxidative coupling reactions using appropriate catalysts known by those knowledgeable in the art as "drying agents". The air drying reactions are known to involve reaction of oxygen with the allylic position of the unsaturated fatty acid and necessarily require intimate contact of the resin with air. Hence, such polyesters can only be used in thin films as protective coatings and paint binders. While these resins give scratch resistance, anti-corrosive protection, and act as vehicles for pigments and fillers they possess no structural strength of their own.

Synthesis of monoglycerides from triglycerides involves ester interchange reactions and alcoholysis of ⅔ of the ester groups of the triglycerides. In the process, the positional isomers of the various fatty acids are randomized, giving mixtures that are mostly monoglycerides but also contain diglycerides, unreacted triglycerides and unreacted glycerol. Mono- and di-glycerides also exist as positional isomers. Those knowledgeable in the art are aware of various catalysts and reaction conditions required for the preparation of monoglycerides with controlled amounts of di and negligible amount of triglycerides.

The synthetic route to the new monomers described in this disclosure starts with the glycerolysis of fatty acid triglycerides to give monoglycerides. The monoglyceride product is actually a mixture containing mostly mono but also, in smaller amounts, di- and triglycerides. Mono- and diglycerides are positional isomers, and the mixture also contains some unreacted glycerol whose amount can be adjusted by adjusting the feed ratio. The complex monoglyceride mixture is then reacted with maleic anhydride under conditions that lead to the formation of the maleate half-esters of mono- and diglycerides and of the excess glycerol. Therefore, all the species in the final product have now been rendered polymerizable by the introduction of the reactive maleate unsaturation. This monomer mixture has not been synthesized before and constitutes a new composition of matter. The resin can then be diluted with reactive monomers such as styrene and is ready for use. In this invention, the synthesis of the monoglycerides was carried out in such a way that the final mixture contained about 80–90% monoglycerides, about 4–10% diglycerides and about 2–6% unreacted glycerol. All of the components were therefore mono, di or trihydroxy compounds. The maleinization reaction was carried out in the presence of a base catalyst such as, but not limited to, calcium hydroxide and under mild thermal conditions, e.g., between about 50 to about 100 C., and preferably about 80 C., such that only maleate half-esters were formed and no attempt was made to increase the molecular weight by polycondensation reactions. The product of the reaction is predominantly monoglyceride-bis maleate half-ester, in a mixture with diglyceride monomaleate halfester and glycerol trimaleate half-ester. The judicious choice of stoichiometry and conditions of the glycerolysis step determined the relative ratios of mono, di and triols in the maleinization mixture and this in turn, determined the relative ratios of mono, di and trimaleates in the maleinized mixture. For those knowledgeable in the art, the significance of the ratio of mono, di and tri unsaturated monomers in a polymerization mixture is clear. The desired cross-link density and cross-link segment lengths can be obtained by adjusting the relative amounts of the above unsaturated products.

Maleinized monoglyceride mixture was then mixed with reactive diluents such as, but not limited to, styrene, α-methyl styrene, methyl methacrylate, divinyl benzene, ethylene glycol dimethacrylate, etc. and cured with the previously mentioned free radical initiators to give rigid thermoset resins. The resin formulation can be further improved by the use of oligomeric cross-linking agents, by adjusting the amount of unreacted glycerol, and by air drying of the unsaturation present in the fatty acid residue. The presence of unreacted glycerol (a monomer with a functionality of 3), which itself is maleated in the next step, constitutes a very novel and convenient method for adjusting cross-link density, whereby the physical properties of the final thermoset can be optimized. The presence of the carboxylic acid group on the maleate half-esters was observed to provide good adhesion with the commonly used reinforcing agents such as, but not limited to, glass, carbon and aramid fibers as well as a number of naturally occurring fibers. These improvements produce a resin system that can be used alone, or reinforced with high-modulus fibers such as, but not limited to, glass, carbon, Kevlar® (Aramid Fiber, DuPont Co.) and natural fibers such as, but not limited to, sisal, jute, hay, hemp, and cotton. The use of natural fibers with the resins described herein promises to give economical, biodegradable, engineering materials with a high level of vegetable-based raw materials. Such materials have a low market cost, they are attractive with respect to global sustainability and should find commercial use as the composite industry becomes more environmentally responsible in the near future. The resins described can be modified by various additives to improve adhesion to these fibers, thereby significantly improving their physical properties and hydrolytic stability. The composites thus formed have physical properties that compare favorably with the previously mentioned petroleum-based commercially successful resins To further increase the functionality of the monoglycerides, the unsaturation when present on the monoglyceride, can be hydroxylated in the same manner described in the previous section. Hydroxylation of the monoglyceride mixture was done prior to maleinization under the same reaction conditions as used when hydroxylating the triglyceride. This provided additional hydroxyl groups along the fatty acid chain, thus increasing the overall functionality of the molecule and its ability to form highly cross linked rigid composites. Maleinization of the resulting hydroxylated monoglyceride was then done again using a base catalyst such as, but not limited to, dimethyl benzyl amine, calcium hydroxide, etc.. The maleinized hydroxylated monoglyceride is now suitable for mixing with a reactive diluent, such as, but not limited to, styrene, a-methyl styrene, methyl methacrylate, divinyl benzene, etc., and curing via free radical polymerization.

A major advantage of the resin system described here is that the polymerization reaction takes place on the double bond provided by the maleate half-ester. This invention does not use the unsaturation of the fatty acid residue for polymerization reactions, except in the previous case using maleinized hydroxylated monoglyceride, where the initial unsaturation was first hydroxylated prior to maleinization. Therefore, the final properties of the resin are quite insensitive to the source of triglycerides used as raw materials.

This allows the use of any triglyceride of plant or animal origin or their mixtures as raw material. The molecular weight and cross-link density would not be effected by seasonal or geographical changes in the raw material. This makes available a large number of saturated and unsaturated triglyceride sources such as, but not limited to, lard, rape, palm, beef tallow, fish, soy, canola, sunflower, safflower, rice bran, corn, peanut, cottonseed and kolza, some of which are essentially inedible and of no other use industrially, as raw materials for the resins disclosed herein.

The glycerolized triglyceride molecules, as a polyol mixture, was also reacted with various diisocyanates such as, but not limited to, toluenediisocyanate, isophorone diisocyanate, methylene diphenyldiisocyanate and polyaromatic polyisocyanate in the presence of tertiary amine catalysts to give foamable rigid thermoset resins. Examples 24–26 describe the synthesis of resins using this chemical approach.

Amidated Triglyceride

Transamidation of esters with primary amines is a well known reaction and triglycerides have been amidated with various amines to yield industrially important compounds. Such fatty acid amides have found use as textile softening agents, anti static agents and sizing agents.

In this invention, transamidation of triglycerides with diethanolamine and tris(2-aminoethyl)amine gave successful rigid resins, suitable for composites. In the case of diethanolamine, the choice of reaction conditions was such that transamidation took place without any transesterification. The resulting mixture was found to contain fatty acid monoamide as positional isomers and glycerol, all polyhydroxy compounds. As such, these polyols were polymerized with various diisocyanates such as, but not limited to, toluene diisocyanate, isophorone diisocyanate, methylene diphenyldiisocyanate and polyaromatic polyisocyanate in the presence of tertiary amine catalysts to give foamable rigid thermoset resins.

The triglyceride diethanolamine amide mixture was then reacted with maleic anhydride without further separation to give a mixture of bis-maleate and tris-maleate half-esters. The maleinization reaction was run under mild conditions and no attempt was made to polyesterify the mixture. This mixture was then combined with reactive diluents and polymerized with free radical initiators to yield a rigid thermoset resin.

The rigid thermoset resin was found to be biodegradable and exhibited substantial weight loss due to the action of fungi and bacteria under aerobic conditions when exposed to a moist soil environment at room temperature for several weeks. Biodegradation tests were done at a burial depth of about 2 inches. The biodegradability of this oil-based resin has the potential for many new applications where the biodegradability of the composite is either an important part of its in-service performance, or facilitates its disposal in terrestrial or aquatic environments.

The reaction of triglycerides with tris(2-aminoethyl) amine was run under such conditions that the only products were diaminoamide of the fatty acids and glycerol. This product was found to be an excellent co-monomer for curing epoxy resins and excellent thermoset resins were obtained when Epon 828 commercial resin or epoxidized triglycerides were used as the epoxy component. Examples 27–29 describe the synthesis of resins according to this chemical approach

EXAMPLES

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described. The examples illustrate representative products and are given by way of illustration only and are not to be considered as being limiting.

Example 1

100 g of epoxidized triglyceride (G-62 Paraplex from C. P. Hall Co.) having an average of 4.2 epoxy groups per triglyceride and an iodine number of 5, and 23 g of acrylic acid were mixed, after which 0.2 g of hydroquinone and 10 drops of 30% benzyltrimethyl ammonium hydroxide solution in methanol were added. The mixture was heated and stirred at 110° C. for 12 hours or until spectroscopic examination showed the disappearance of the desired amount of the epoxide groups. This is the acrylated base resin . Acrylated base resin was mixed with styrene and divinyl benzene in the ratio 100:45:5 and cured with USP-245 free radical initiator at 90° C. for one hour and 110° C. for one hour to give a rigid resin with flexural modulus of 723 MPa and surface hardness of 79 (Shore D)

The corresponding values for commercial amine cured epoxy resins are 2000 MPa and 85(Shore D)

Example 2

80 g of the acrylated base resin, having approximately 8% of the epoxy groups unreacted, was mixed with 10 g of maleic anhydride and heated to 80° C. for 4 hours. An increase in viscosity was observed along with the disappearance of the remaining epoxy group absorbance in the IR spectrum. This is the unsaturated anhydride modified base resin. When this resin was cured using the method of Example 1, a 60% improvement in the flexural modulus and 5% improvement in surface hardness was observed. The glass transition temperature, Tg, of the cured resin was found to be 135° C.

Example 3

80 g of the acrylated base resin, having approximately 8% of the epoxy groups unreacted, was mixed with 2.5 g of maleic acid at 110° C. and stirred for 2 hours. An increase in viscosity was observed. This is the maleic or fumaric acid modified base resin. This resin when cured according to the conditions described in Example 1 gave flexural modulus of about 2 GPa, surface hardness of 80 (Shore D) and a Tg of 102° C. The flexural modulus of commercial polyester resins is about 3.0 GPa

Example 4

80 g of the acrylated base resin, having approximately 8% of the epoxy groups unreacted, was mixed with 4 g of polyaromatic polyisocyanate (PAPI manufactured by Dow Chemical, Midland Mich.), and 0.1 g of diazobicyclo [2.2.2] octane was added as a catalyst. The mixture was heated at 60° C. for 2 hours. An increase in viscosity and the disappearance of the isocyanate absorption in the IR spectrum was observed. This is the diisocyanate modified base resin. This resin when cured according to the conditions described in Example 1, gave a flexural modulus of about 1.2 GPa , Tg of 77 C. and a surface hardness of 78 (Shore D). The flexural modulus of commercial vinyl ester resins is about 2 GPa.

Example 5

80 g of the acrylated base resin, having approximately 8% of the epoxy groups unreacted, was heated at 110° C. under 1 mm Hg pressure with a downward distilling apparatus to remove unreacted acrylic acid. Approximately 4 ml of acrylic acid was removed. This base resin was mixed with 2 g of methylene dicyclohexyl amine and then diluted with reactive diluent styrene to the extent of 100 g of resin to 45 g of styrene. This mixture was degassed by purging with nitrogen for 5 minutes and 1.5% USP 245 radical initiator. Cure of this mixture at 110° C. for one hour and postcure at 130° C. for 3 hours gave the cross-linked diamine modified base resin.

Example 6

80 g of the acrylated base resin, having approximately 8% of the epoxy groups unreacted, was treated as previously described so that no unreacted acid was left in the mixture. This base resin was treated with 0.2 g of titanium isopropoxide and heated at 80° C. for 2 hours. Color change to a deep red, and an increase in viscosity was observed. This is the ring opening modified base resin. This resin, when cured according to the conditions described in Example 1, gave flexural modulus of about 1 GPa, surface hardness of 78 (Shore D) and a Tg of 68° C.

Example 7

80 g of the acrylated base resin, having approximately 8% of the epoxy groups unreacted, was mixed with 9 g of cyclohexane dicarboxylic anhydride and heated for 1 hour at 110° C. An increase in viscosity and reduction in the epoxide absorption in the IR spectrum was observed. This is the saturated anhydride modified base resin. This resin when cured according to the conditions described in Example 8 gave dynamically measured storage modulus of about 2 GPa and a Tg of about 75° C. Dynamic mechanical tests were conducted at a frequency of 1 cycle/sec and a heating rate of 5° C./min, using a Rheometrics dynamic mechanical analyzer

Example 8

100 g of the acrylated base resin, or any of the modified resins, was mixed with 45 g of styrene and 5 g of divinyl benzene. The mixture was degassed by purging with nitrogen for 5 minutes. 1.0 g of USP 245 free radical initiator was added, and the mixture was injected into a resin transfer mold (RTM) containing a preform made of woven glass fiber with a suitable sizing. The mold was heated at 110° C. for 40 minutes and then at 130° C. for 2 hours to give a glass-fiber-reinforced composite. Neat-resin properties of resins cured according to this example were measured and the flexural modulus E (MPa), glass transition temperature, Tg (°C.) and dynamically measured storage modulus E' (GPa) of the base resin was found to be E=400 MPa, Tg=67° C. and E'=0.77 GPa. For the maleic anhydride modified resin, E=960 MPa, Tg=102° C. and E'=1.60 GPa.

The composite properties of the base resin with 45% woven glass fiber were as follows, maximum tensile strength, 38.9 ksi (268 MPa) (according to ASTM D 3039-76); tensile modulus 2.49 Msi (17.2 GPa) (according to ASTM D 3039-76); flexural strength 260 MPa (37.3 ksi, according to ASTM D-790-86); and flexural modulus 11.3 GPa (1.64 Msi, according to ASTM D 790-86).

The fracture toughness $K_{1c}$, of the woven glass fiber reinforced base resin measured by center notch tension (ASTM Number pending) was determined to be about 32 MPa.$m^{1/2}$, using fracture mechanics specimens with typical dimensions of width w=3.6 cm, center crack length 2a=2.0 cm, and thickness B=0.33 cm. In these fracture experiments, the typical maximum applied fracture loads were about 350 N (3,755 lb).

Composites manufactured with commercially successful orthophthalic acid propylene glycol type polyesters cured similarly and having similar glass fiber contents have tensile strengths about 500 MPa and tensile modulus of about 20 GPa

Example 9

100 g of epoxidized triglyceride was mixed with 45 g of methylene dicyclohexyl amine and 1.0 g of 2-methyl imidazole. The mixture was heated at 90° C. for 1 hour and then transferred to an RTM mold containing glass fiber preform. The mold was heated at 130° C. for one hour to give a rigid thermoset.

Example 10

40 g of epoxidized triglyceride was mixed with 16 g of isophthalic acid and 0.3 g of 2-methylimidazole and the mixture was heated at 90° C. for 1 hour. The mixture was then transferred to a mold and heated for an hour at 140° C. to give a rigid thermoset resin.

Example 11

40 g of epoxidized triglyceride was mixed with 18 g of phthalic anhydride and the mixture was stirred and heated at 90° C. until phthalic anhydride dissolved. The resulting mixture was transferred to a mold and heated for 1½ hours at 140° C. to give a rigid thermoset resin.

Example 12

100 g of epoxidized triglyceride was mixed with 30 g of bisphenol-A and 0.6 g of 2-methylimidazole. The mixture was stirred at 100° C. for one hour or until it reached the desired viscosity and then transferred to a mold. The mold was heated at 180° C. for 1 hour to give a rigid thermoset resin.

Example 13

40 g of epoxidized triglyceride was mixed with 0.8 g of borontrifloride-ethylamine complex and transferred to a mold. Heating at 90° C. for one hour gave a rigid thermoset resin.

Example 14

40 g of epoxidized triglyceride was mixed with 1.0 g of titanium isopropoxide and heated at 60° C. for two hours. The product was a rigid thermoset resin. The reaction could be stopped at any time by adding 1 ml of water and resilient rubbers of different toughness could be obtained according to the extent of reaction.

Example 15

40 g of epoxidized triglyceride was emulsified with 20 g of water and 4 g of concentrated hydrochloric acid by high shear stirring at room temperature. The mixture was taken to 40° C. and stirred for one hour. The mixture was allowed to phase separate and the top layer of hydrolyzed epoxidized triglyceride was removed and dried by heating under 4 mm pressure at 70° C. for 2 hours to give 32 g of the hydrolyzed epoxidized triglyceride. 20 g of the hydrolyzed epoxidized triglyceride was mixed with 12 g of polyaromatic polyisocyanate (PAPI) and 0.3 g of [2.2.2]diazobicyclooctane. The mixture became viscous at room temperature in 30 minutes and was transferred into a mold and heated at 60° C. for 2 hours to produce a rigid thermoset resin.

Example 16

27 g of maleic anhydride was added to 32 g of the hydrolyzed epoxidized triglyceride of Example 14, and the mixture was heated to give a viscous oil. The oil was diluted with 22 g of styrene and 1.0 g of USP 245 free radical initiator was added. Heating the mixture at 80° C. for 1 hour and at 110° C. for an additional hour gave a rigid thermoset resin. The flexural modulus and Tg of the cured resin were 1020 MPa and 70° C., respectively. The physical properties of this resin are generally comparable to those of commercially available orthophthalic polyesters.

Example 17

1000 g of plant triglyceride was mixed with 1000 ml of 88% formic acid in a reactor equipped with a cooling jacket. 500 ml of 30% hydrogen peroxide was added in 50 ml portions in 10-minute intervals. The reaction was vigorously stirred for 5 hr. The emulsion was poured into a separator funnel and extracted with ether. The water layer was discarded, and the ether layer was washed with water, dilute sodium bicarbonate solution, and saturated sodium chloride solution, respectively. The resulting ether solution was dried over magnesium sulfate, and the ether was removed by a rotary evaporator to yield 1150 g of hydroxylated soyoil.

Example 18

144.4 g of maleic anhydride (MA) and 0.4 g of hydroquinone were added to 400 g of hydroxylated triglyceride in a 1 L round-bottom flask. The mixture was warmed to 50° C. under stirring to dissolve all the maleic anhydride. The temperature was further raised to 100° C., and 15 ml of benzyl dimethyl amine was added in two portions. The reaction was kept at 100° C. for 3 hr. under stirring to obtain the maleinized product with a 4:1 molar ratio of MA to hydroxylated triglyceride.

Example 19

100 g of maleinized hydroxylated triglyceride from Example 18 was mixed with 45 g of styrene and 5 g of divinyl benzene ; 2.25 g of USP 245 was added, and the mixture was degassed by purging with nitrogen for 10 minutes. The mixture was injected into an RTM mold containing the fiber preform. The mold was then heated at 100° C. for 1 hr and 120° C. for 1 hr to provide a cured fiber-reinforced composite sample.

Example 20

10 g of hydroxylated triglyceride was mixed with 10 g of Epon 828 and 5 g of maleic anhydride. The mixture was warmed up to 60° C. to dissolve the maleic anhydride and 2 ml of benzyldimethylamine was added. The resin was poured into a mold with or without fiber preform and cured at 90° C. for 1 hour to yield a rigid thermoset sample.

Example 21

Maleinization of triglyceride was accomplished by following procedures described in the literature, by heating 100 g of triglyceride with 27 g of maleic anhydride at 200° C. for 2 hours. The sample contained 0.002 moles of anhydride per gram. 100 g of the maleinized triglyceride was cooled to 4° C. and mixed with 30 g of methylene dicyclohexylamine, also cooled to 4° C., and the mixture was stirred and allowed to come to room temperature. The mixture was then heated at 80° C. for one hour to give a rigid thermoset resin.

Example 22

100 g of maleinized triglyceride from Example 21 was mixed with 18 g of pentaerythritol and heated at 130° C. to give a rigid thermoset resin.

Example 23

50 g of maleinized triglyceride from Example 21 was mixed with 40 g of Epon 828 commercial epoxy resin and 0.2 g of 2-methylimidazole. The mixture was placed in a mold and heated at 80° C. for one hour to give a rigid thermoset resin.

Example 24

Glycerolysis of triglycerides were done by following the procedures given in the literature. Thus, 240 g of triglyceride was mixed with 60 g of glycerol and 0.2 g of calcium hydroxide and heated at 230° C. for 4 hours. The resulting mixture contained 88% monoglyceride, 4% diglyceride and 4% triglyceride and 4% glycerol. This is the glycerolized triglyceride mixture. To 40 g of the glycerolized triglyceride mixture, 20 g of maleic anhydride was added and the mixture heated at 100° C. for 2 hours to give maleinized monoglyceride. The resulting mixture was diluted with 25 g styrene and 1 g divinylbenzene and 1 g of USP 245 free radical initiator was added. The mixture was cured in a mold at 70° C. to give a rigid thermoset resin. The flexural modulus and Tg of the cured resin were 720 MPa and 135° C., respectively. The commercially successful polyester resins have heat deflection temperatures of about 80 C.

Example 25

30 g of glycerolized triglyceride mixture from Example 24 was mixed with 15 g of isophorone diisocyanate and 0.1 g [2.2.2]diazobicyclooctane. Curing the mixture at 60° C. for 3 hours gave rigid thermoset resins, while curing at 60° C. for ½ hour gave a foamed thermoset resin with a specific gravity of 0.2.

Example 26

1 g of hydroxylated monoglyceride was heated to 60° C. 0.25 g of hydroquinone radical inhibitor, 0.5 g of maleic anhydride, and 6 drops of dimethyl benzyl amine were added and the reaction heated at 90° C. for one hour forming the maleinized hydroxylated monoglyceride. The maleinized hydroxylated monoglyceride was heated to 90° C., mixed with 1 g styrene, and allowed to cool to room temperature. 2 drops of USP 245 free radical initiator were added and the mixture cured at 90° C. for one hour giving a rigid thermoset polymer.

Example 27

32 g of triglyceride was mixed with 10 g diethanolamine and heated to 180° C. The mixture slowly became one phase and was heated for a total of 2 hours, or until the mixture was soluble in methanol. This is the triglyceride diethanolamine amide. To this mixture 16 g of maleic anhydride was added and the mixture was kept at 100° C. for 15 minutes to give the maleinized fatty acid amide. This mixture was mixed with 22 g styrene and 1 g USP 245 free radical initiator and heated in a mold to give a rigid thermoset resin. The flexural modulus of the cured resin was 340 MPa.

Example 28

18 g of toluenediisocyanate was added to 40 g of the triglyceride diethanolamine amide obtained in Example 25.

The reaction started at room temperature and the mixture gelled in 30 minutes. Continued heating at 125° C. for one hour gave a rigid thermoset resin.

Example 29

40 g of triglyceride was mixed with 18 g of tris(2-aminoethyl)amine and the mixture was heated at 160° C. for one hour. The resulting product was mixed with 90 g of Epon 828 and polymerized by heating at 70° C. for 3 hours. The result was a rigid thermoset resin.

Example 30

333 g of acrylated epoxidized triglyceride was mixed with 150 g styrene, 17 g divinyl benzene, and 10 g USP 245 free radical initiator. The mixture was degassed by purging with nitrogen for 5 minutes. The resin mixture was then injected into an RTM mold containing a preform made from hemp fiber mat such that the fiber volume fraction of the resulting composite was 24%. The mold was heated at 90° C. for 1 hour and at 110° C. for one hour to produce a rigid hemp fiber composite. The resulting composite had a tensile modulus of about 4 GPa, a toughness $K_{1c}$ of about 3 MPa.m$^{1/2}$ and a fracture energy of about 2 kJ/m$^2$.

Example 31

200 g of acrylated epoxidized triglyceride was mixed with 90 g styrene, 10 g divinyl benzene and 6 g USP 245 free radical initiator. The mixture was degassed by purging with nitrogen for 5 minutes. Separately 60 g of straw fibers were pressed into a preform in a molding press and transferred to an RTM mold. The resin mixture was injected and the mold was heated at 90° C. for 1 hour and 110° C. for 1 hour to produce a rigid straw fiber reinforced composite.

Example 32

100 g of maleinized hydroxylated triglyceride was mixed with 45 g styrene, 5 g divinyl benzene and 1.5 g USP 245 free radical initiator. The mixture was degassed by purging with nitrogen for 5 minutes. The resin mixture was injected into an RTM mold containing woven carbon fiber preform and the mold was heated at 90° C. for 1 hour and 110° C. for 1 hour to produce a rigid carbon fiber reinforced composite.

Example 33

330 g of maleinated hydroxylated triglyceride was mixed with 12 g Dow Derakane 411 vinyl ester resin and 6 g of USP 245 free radical initiator. The mixture was degassed by purging with nitrogen for 5 minutes. The resin mixture was injected into an RTM mold containing woven glass fiber preform and the mold was heated at 90° C. for 1 hour and 110° C. for 1 hour to produce a rigid glass fiber reinforced composite.

Example 34

8 g of acrylated epoxidized triglyceride was mixed with a range of 2–8 g of Dow Derakane 411 vinyl ester resin. and 0.2 g of USP 245 free radical initiator. The mixture was purged with nitrogen for 5 minutes and heated at 90° C. for one hour, and at 110° C. for one hour, to give a rigid thermoset resin. Commercial bisphenol-A vinyl ester resins have the following cured neat resin properties: tensile modulus, about 3 GPa; Elongation at break, 10%; flexural modulus, 2.8 GPa; and heat deflection temperature, 75 C. The properties of resins prepared according to Example 34 are similar in terms of cure characteristics, processing and their optical, thermal and mechanical properties.

Example 35

80 g of maleinized fatty acid monoglyceride was mixed with 30 g of styrene and 20 g of glass fibers chopped to 6 mm length. The mixture was tumbled in a ball mixer for 10 minutes to give a bulk molding compound (BMC) resin with 15% glass content. The resulting mixture was mixed with 0.6 g 10% cobalt naphtenate and 1 g methyl ethyl ketone peroxide and was placed in a mold containing chopped glass fiber. The molding compound was allowed to cure at room temperature to give a rigid chopped fiber reinforced composite. The resulting composite product had surface properties and mechanical properties that were similar to BMC compounds using commercially available polyester resins

Example 36

100 g of epoxidized triglyceride was mixed with 30 g of bisphenol-A and 0.6 g of 2-methylimidazole. The mixture was stirred at 100° C. for one hour, or until it reached the desired viscosity and then transferred at atmospheric pressure into an open mold which was preheated to 90° C. and which contained 18 g of %o glass fiber woven cloth. The mold was heated at 180° C. for 1 hour to give a rigid thermoset glass fiber reinforced composite.

Example 37

100 g of maleinized fatty acid diethanolamide was mixed with 30 g of styrene, 1.5 g of cobalt naphtenate and 1.0 g of methyl ethyl ketone peroxide. The mixture was hand laid up on a 50 cm×50 cm sample of 600 g/m$^2$ chopped glass fiber mat and allowed to cure at room temperature. The product was a rigid glass fiber reinforced composite.

Example 38

40 g of maleinized fatty acid monoglyceride and 40 g of maleinized fatty acid diethanolamide was mixed with 30 g of styrene, 0.6 g dimethyl aniline and 0.8 g benzoyl peroxide. The mixture was degassed for 5 minutes by purging with nitrogen and heated in a mold at 90° C. for 1 hour and at 110° C. for 1 hour. The product was a rigid thermoset resin.

Example 39

1500 g of acrylated epoxidized triglyceride was mixed with 750 g styrene, 113 g divinyl benzene, 18 g cobalt naphthalate and 68 g Trigonox 239 free radical initiator. The resin was infused into a glass fiber preform by Seemann's Composite Resin Injection Molding Process (SCRIMP). The composite was cured for 12 hours at room temperature and postcured for 2 hours at 150° C., resulting in a rigid thermoset composite

Example 40

40 g of maleinized fatty acid monoglyceride and 40 g of acrylated epoxidized triglyceride were mixed with 30 g of styrene, 0.6 g dimethyl aniline and 0.8 g benzoyl peroxide. The mixture was degassed for 5 minutes by purging with nitrogen and injected into a mold. The mixture was heated at 90° C. for 1 hour and at 110° C. for 1 hour. The product was a rigid thermoset resin.

Example 41

110 g of acrylated epoxidized triglyceride was mixed with 45 g of styrene 7.5 g of sulfur vulcanized soybean oil rubber resin was powdered at 0° C. and added to the mixture in Example 40 by high shear stirring. 1.5 g of USP 245 free radical initiator was added and the mixture was heated in a mold at 90° C. for 1 hour and at 110° C. for 1 hour. The product was a toughened rigid thermoset resin.

Example 42

45 g of acrylated epoxidized triglyceride was mixed with 1.5 g titanium isopropoxide and heated and stirred at 95° C. The mixture became viscous in 40 minutes and gelled in 90 minutes and gave a rubbery polymer in 3 hours. This rubbery polymer was ground to a fine powder at 0° C., washed twice with acetone and dried to give a resilient material. 1 g of the material was mixed with 12 g of acrylated epoxidized triglyceride and 8 g of styrene and 0.2 g of USP 245 free radical initiator. This mixture was heated at 90° C. for one hour and at 110° C. for 1 hour to give a toughened thermoset resin.

Example 43

30 g of maleinized triglyceride of Example 21 was mixed with 13 g of glycerolized triglyceride mixture from Example 24 and heated at 110° C. for 1 hour and at 130° C. for 2 hours. The product was a resilient rubber. The product was powdered at 0° C. and washed twice with acetone to give a resilient material. 1 g of this material was mixed with 12 g of maleinized fatty acid monoglyceride, 8 g styrene and 0.3 g USP 245 free radical initiator. The mixture was stirred at room temperature for 5 minutes until material particles were swollen and dispersed and then heated 1 hour at 90° C. and 1 hour at 110° C. in a mold. The product was a toughened rigid thermoset resin.

We claim:

1. A process to produce a resin or composite which comprises maleinizing a hydroxylated plant or animal oil or monoglyceride to a maleate half ester and then copolymerizing said maleinized oil with a radically reactive monomer selected from the group consisting of styrene, methyl methacrylate, divinyl benzene and ethylene glycol dimethacrylate to form a rigid solid resin or composite.

2. The process as claimed in claim 1, wherein said oil is a triglyceride.

3. The process as claimed in claim 1, wherein said oil is hydroxylated soy bean oil.

4. The process as claimed in claim 1, wherein said oil is hydroxylated or non-hydroxylated soy bean oil monoglyceride.

5. The process as claimed in claim 1, wherein said oil is hydroxylated or non-hydroxylated soy bean oil diethanolamide.

6. The process as claimed in claim 1, wherein said reactive diluent is α-methyl stryrene.

7. The process as claimed in claim 1, wherein said reactive diluent is stryrene.

8. The process as claimed in claim 6, wherein said oil is soy bean oil.

9. The process as claimed in claim 8, further comprising curing said with a free radical initiator.

10. The process as claimed in claim 1, which further comprises adding an oligomeric cross-linking agent.

11. The process as claimed in claim 1, wherein said oil contains triesters of fatty acids linked together with glycerol and the process further comprises adjusting the amount of unreacted glycerol.

12. The process as claimed in claim 1, wherein said oil contains triesters of fatty acids linked together with glycerol and the process further comprises air drying of the unsaturation present in the fatty acid residue.

13. The resin prepared by the process as claimed in claim 1.

14. A thermoset resin or composite mixture which comprises at least two different resins, with at least one of said resins being said resin as claimed in claim 13.

15. The resin or composite as claimed in claim 13, which further comprises an admixture of at least one elastomeric toughening agent.

16. The resin or composite as claimed in claim 15, which further comprises the resin or composite is reinforced with at least reinforcing memberwhich is selected from the group consisting of glass, carbon, aramid, boron, silicone carbide, man made fibers and natural fibers.

17. The resin or composite as claimed in claim 16, wherein said reinforcing member is an animal fiber, plant fiber or vegetable fiber.

18. The resin or composite as claimed in claim 17, wherein said animal fiber is wool, cashmere, hair or bird feathers.

19. The resin or composite as claimed in claim 16, wherein said plant fiber or said vegetable fiber is cotton, sisal, fibrous cellulose, hemp, hay, straw, flax, jute, or pine needles.

20. A process to produce a polymer or composite which comprises treating the resin as claimed in claim 13, by Resin Transfer Molding (RTM), Reaction Injection Molding (RIM), Seeman's Composit Resin Infusion Manufacturing Process (SCRIMP), Atmospheric Pressure Molding (APM) or Bulk Molding Compound (BMC).

* * * * *